United States Patent Office 3,574,760
Patented Apr. 13, 1971

3,574,760
PROCESS FOR THE PREPARATION OF AMINES
Ichiro Sasaki and Shoichi Nishizaki, Kyoto, Japan, assignors to Dai-ichi Kogyo Seiyaku Kabushiki Kaisha, Kyoto, Japan
No Drawing. Filed Aug. 2, 1968, Ser. No. 749,570
Claims priority, application Japan, Aug. 3, 1967, 42/49,879
Int. Cl. B01j 11/78; C07c 85/00
U.S. Cl. 260—583        13 Claims

ABSTRACT OF THE DISCLOSURE

A process for preparing an aliphatic amine which comprises the steps of reacting an olefine having at least 4 carbon atoms which hydrocyanic acid in the presence of an acid catalyst consisting of sulfuric acid, water, and boron trifluoride, and thereafter hydrolyzing the resulting reaction product with an acid or alkali.

BACKGROUND OF THE INVENTION

This invention relates to a process for preparing amines which comprises reacting an olefine with hydrocyanic acid in an acid catalyst consisting of sulfuric acid, water and boron trifluoride, and hydrolyzing the resulting reaction product with an acid or alkali to obtain an amine.

Heretofore, a process for preparing an amine which comprises reacting an olefine with a nitrile in sulfuric acid to produce an N-alkylamide and hydrolyzing the thus-obtained N-alkylamine to produce the desired amine was well known. Also, in 1964, a process in which an amine is prepared by reacting an α-olefine with a nitrile in 98% sulfuric acid to produce the corresponding amide and hydrolyzing the amide to yield the desired amine was like-wise known.

In addition to the above well-known processes, some processes for preparing amines from olefines by using a reaction medium-catalyst system other than sulfuric acid were known, but none of these processes produce the desired product in high yield. In the reaction for producing an amine from an olefine, sulfuric acid having a concentration of 95% or more has been considered to be the most effective reaction medium, and it was known that the higher the concentration, the better the results obtained and that fuming sulfuric acid will be required when the olefine has lower reactivity. However, in the above processes where a concentrated sulfuric acid is used, the desired products are usually obtained in lower yield because large amounts of by-products are concomitantly produced and yet the products are considerably colored, and, therefore, the known processes are not suitable as industrial manufacturing processes.

The object of this invention is therefore to provide a process for preparing amines in high yield.

SUMMARY OF THE INVENTION

The present inventors have found that a composition consisting of a three-component system of sulfuric acid, water and boron trifluoride is effective as a catalyst for preparing an amine from an olefine.

Accordingly, the present invention relates to a process for preparing an aliphatic amine which comprises reacting an olefine having at least 4 carbon atoms with hydrocyanic acid in a catalyst consisting of sulfuric acid, water and boron trifluoride and hydrolyzing the resulting reaction product with an acid or alkali.

DETAILED DESCRIPTION OF INVENTION

In the process of this invention, any olefine having at least 4 carbon atoms can be used, particularly, an olefine such as α-olefine, a mixture of α-olefines having different numbers of carbon atoms, a dimer, trimer or tetramer of propylene, butylene or a dimer, trimer or tetramer thereof, unsaturated fatty acids and the like are preferred.

As set forth above, the acid catalyst used in the present invention consists of a three-component system of sulfuric acid, water and boron trifluoride. It has been found that, when, in place of said three-component system, sulfuric acid, boron trifluoride or boron trifluoride hydrate is used independently, the yield of the amine is considerably decreased. This indicates that the three-component catalyst system used in the present invention exhibits an excellent synergistic action thereby increasing the yield of amines. The best results are obtained by use of a catalyst in which the proportions of the components are in the range of 23–85% sulfuric acid, 5–30% water and 5–60% boron trifluoride, and, in such a case, the yield of amines reaches more than 95%.

The acid catalyst disclosed herein can be used not only in liquid form but also in solid form in which the three-components are supported on a solid carrier. That is, the catalyst in solid form may be prepared by impregnating a carrier such as active carbon, active alumina, aluminum sulfate or the like, with sulfuric acid having a predetermined concentration and thereafter allowing the carrier to absorb boron trifluoride, or, alternatively, by allowing a carrier to absorb water and boron trifluoride, the carrier then being used in combination with sulfuric acid. In both cases, substantially the same results can be obtained as those obtained by using the above described three-component catalyst system in liquid form.

In the catalyst in solid form, the proportions of the components other than the solid carrier may be the same as those in the catalyst in liquid form.

The term "hydrocyanic acid" used herein includes a liquid hydrocyanic acid, a gaseous hydrocyanic acid eluted by the reaction of sodium cyanide with an acid, or a liquefied hydrocyanic acid obtained from the gaseous hydrocyanic acid, as well as a hydrocyanic acid evoluted in situ by adding an acid to sodium cyanide in a reactor. Also, an aqueous hydrocyanic acid solution can be used by considering the relationship with the composition of the catalyst as a reaction medium.

The process of this invention may be illustrated by the following reaction equation:

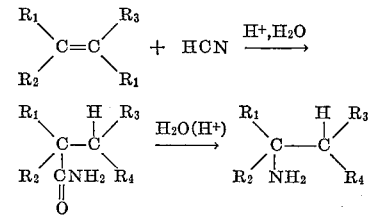

wherein $R_1$, $R_2$, $R_3$ and $R_4$ are each selected from the group consisting of hydrogen and straight- and branched-chain aliphatic hydrocarbon radicals (inclusive of those in which the $R_1$ and $R_2$ group and the $R_3$ and $R_4$ group are bonded together), and may be substituted with carboxyl radicals, the sum of the carbon atoms in $R_1$, $R_2$, $R_3$ and $R_4$ being from 4 to 30.

In a preferred embodiment of this invention, 1 mole of an olefine and 200 g. of a catalyst are charged into a reactor, and thereafter 30–40 g. (1.1–1.5 moles) of a liquid hydrocyanic acid is added to the reactor while cooling. The reaction may be carried out at a temperature in the range of −20° C. to 100° C., preferably in the range of 10° C. to 60° C. The reaction mixture is then reacted with water to produce the corresponding formamide, which is subsequently hydrolyzed under acidic conditions, and the hydrolyzate is made neutral with an alkali to give the desired amine.

Examples of the amines obtained by the present invention are as follows:

(1) N-secondary-alkyl primary amines represented by the formula

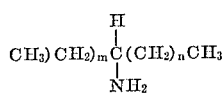

Wherein $m+n$ is an integer from 3 to 28 obtained from an α-olefine feed stock. For example:

N-secondary-hexyl primary amine
N-secondary-heptyl primary amine
N-secondary-octyl primary amine
N-secondary-nonyl primary amine
N-secondary-decyl primary amine
N-secondary-undecyl primary amine
N-secondary-dodecyl primary amine
N-secondary-tridecyl primary amine
N-secondary-tetradecyl primary amine
N-secondary-pentadecyl primary amine
N-secondary-hexadecyl primary amine
N-secondary-heptadecyl primary amine
N-secondary-octadecyl primary amine
N-secondary-nonadecyl primary amine
N-secondary-eicocyl primary amine
N-secondary-heneicocyl primary amine
N-secondary-dococyl primary amine
N-secondary-tricocyl primary amine
N-secondary-tetracocyl primary amine
N-secondary-pentacocyl primary amine
N-secondary-hexacocyl primary amine
N-secondary-heptacocyl primary amine
N-secondary-octacocyl primary amine
N-secondary-nonacocyl primary amine
N-secondary-triacontyl primary amine (2) A mixture of the primary amines listed in (1) above.

(3) Amines produced from propylene or butylene or a dimer, trimer or tetramer thereof. For example:

N-branched-hexyl primary amine mixture
N-branched-nonyl primary amine mixture
N-branched-dodecyl primary amine mixture
N-branched-octyl primary amine mixture (4) Amino acids produced from an unsaturated aliphatic acid feed stock.

It has been found that the use of the catalyst of this invention makes it possible to produce amines in extremely high yield as compared with the yield of about 40% obtained by use of a commonly employed 98% sulfuric acid.

The catalyst of this invention is also advantageous in that it retains its activity for a prolonged period of time regardless of the kind of olefine feed stock and the length of the carbon chain in the olefine. The catalyst disclosed herein can easily be recovered from the reaction mixture before the hydrolysis step by adding water in an amount at least chemical equivalent to or, usually, 2 to 4 times that of the reaction mixture.

Thus, the process of this invention is superior to the conventional processes in that it produces amines in higher yield and has various uses, and that the catalyst can easily be recovered and reused. The process of this invention is also advantageously adaptable for industrial manufacture since the process can be operated at normal temperature and pressure with a relatively simple apparatus.

DESCRIPTION OF PREFERRED EMBODIMENTS

The following examples are further illustrative of this invention, and it will be understood that the invention is not limited thereto.

Example 1

(1) Aqueous sulfuric acid solutions having different concentrations were heated to 100° C. and saturated with a gaseous boron trifluoride to obtain catalysts. Also, water at 0° C. was saturated with a gaseous boron trifluoride to obtain boron trifluoride hydrate ($H_2O \cdot BF_3$). The catalysts thus prepared had the composition shown in Table 1 below.

TABLE 1

| | Concentration of sulfuric acid, percent | Composition, percent | | |
|---|---|---|---|---|
| | | Sulfuric acid | BF$_3$ | Water |
| Catalyst: | | | | |
| a | 98 | 96.3 | 1.7 | 2.0 |
| b | 95 | 92.2 | 2.9 | 4.9 |
| c | 90 | 82.3 | 8.5 | 9.2 |
| d | 85 | 65.6 | 22.8 | 11.6 |
| e | 80 | 60.0 | 15.4 | 24.6 |
| f | 65 | 36.4 | 43.6 | 20.0 |
| g | 50 | 23.1 | 53.8 | 23.1 |
| h | 0 | 0 | 78.3 | 21.7 |

(2) Into a one-liter reaction flask equipped with a mechanical stirrer, a thermometer, a reflux condenser and a dropping funnel was charged 200 g. of the catalyst prepared by the procedure of (1) above. The content of the flask was cooled to near 0° C. and 40 g. (about 1.5 moles) of liquid hydrocyanic acid was slowly added thereto while stirring. 170 g. (about 1 mole) of dodecene-1 was then added dropwise to the flask from the dropping funnel over 20 minutes while keeping the contents in the flask at a temperature of 10 to 30° C. by cooling. Cooling was then discontinued and the flask was allowed to stand for an hour at a temperature of 40 to 60° C. by taking advantage of the heat of reaction or, if necessary, supplying additional heat to complete the reaction. After allowing the reaction mixture to cool, 20 to 50 g. of distilled water was added to the flask, and the mixture was stirred and allowed to stand for an hour. The reaction mixture was thereby separated into two layers, the upper layer consisting of the corresponding foramide and the lower layer consisting of the catalyst, the lower layer then being removed from the upper layer. About 400 ml. of 40% sulfuric acid was added to the organic layer and the mixture was hydrolyzed at 100° C. to 200° C. for 3 hours. The excess of acid was then removed from the resulting reaction mixture, to which an alkali was added to a point at which the color of phenolphthalene changes to separate the amine in the upper layer. After removal of the lower layer, the upper layer was washed with water and distilled under reduced pressure to remove the remaining water thereby giving an N-secondary-dodecyl primary amine.

The above procedure was repeated by using the catalysts (Table 1) in the amounts indicated in Table 2 to produce the same amine. The yields of the amine were as shown in Table 2.

TABLE 2

| Catalyst, percent concentration of sulfuric acid | Amount of catalyst [1] | Yield of amine, percent |
|---|---|---|
| a (98) | 200 | 45 |
| b (95) | 200 | 51 |
| c (90) | 200 | 93 |
| d (85) | 200 | 96 |
| e (80) | 200 | 95 |
| f (65) | 200 | 94 |
| g (50) | 200 | 93 |
| h (0) | 200 | 37 |
| 98% sulfuric acid only | 400 | 40 |

[1] Gr. per 1 mole of dodecene-1.

As is clear from the above table, high yields are obtained with the catalysts c to g, i.e. the catalysts in which 90 to 50% aqueous sulfuric acid is saturated with boron trifluoride, this satisfying the requirements for manufacture of the amine in industry.

On the other hand, a yield of only 40% was obtained when the conventional 98% sulfuric acid was used as a catalyst. Also, a yield of only 37% was obtained with the catalyst h consisting of water and trifluoride without containing sulfuric acid. Thus, the above results clearly indicate that the three-component catalysts system of this invention is extremely effective.

Example 2

(1) Amines were prepared following the procedure described in Example 1 but using the catalyst c in Table 1 [$H_2SO_4 + \frac{1}{2}H_3O(BF_3OH)$] and the olefines listed in Table 3 below.

TABLE 3

| Olefine feed stock: | Yield of amine (percent) |
|---|---|
| Octene-1 | 98 |
| Dodecene-1 | 96 |
| Tetradecene-1 | 96 |
| Hexadecene-1 | 95 |
| Octadecene-1 | 95 |
| $C_6$–$C_{10}$ α-olefine | 98 |
| $C_{11}$–$C_{14}$ α-olefine | 97 |
| $C_{15}$–$C_{20}$ α-olefine | 94 |
| $C_{21}$–$C_{30}$ α-olefine | 88 |

It is clearly understood from the above results that the amines are always obtained in high yield by using the three-component catalyst system of this invention regardless of the kind of olefine feed stock.

(2) The amines were synthesized in the same manner as in Example 1 but using the catalyst c shown in Table 1 and the olefine feed stock listed in Table 4 below.

TABLE 4

| Olefine feed sotck: | Yield of amine (percent) |
|---|---|
| Propylene trimer | 98 |
| Propylene tetramer | 97 |
| Propylenepentamer | 97 |
| Propylenehexamer | 95 |
| Butylenetetramer | 95 |
| Butylenepentamer | 95 |
| Di-isobutylene | 98 |

The above results clearly indicate that the amines can be obtained in high yields by using a three-component catalyst of this invention regardless of the kind of olefine to the feed.

Example 3

(1) The catalyst h shown in Table 1, i.e. boron trifluoride monohydrate, was mixed with aqueous sulfuric acid solution having different concentrations to prepare catalysts.

(2) Catalysts having the same composition as those of the catalysts a–g shown in Table 1 of Example 1(1) were prepared and amines were synthesized in the same manner as in Example 1 by using the thus-prepared catalysts to obtain the same results as those shown in Table 2. Thus, it was understood that the three-component catalyst composition prepared by mixing an aqueous solution of sulfuric acid with boron trifluoride hydrate is effective in the same manner as those prepared by saturating an aqueous sulfuric solution with boron trifluoride.

Example 4

(1) Following the procedure of Example 3(1), the catalysts shown in Table 5 were prepared.

(2) N-secondary-hexadecyl primary amine was then synthesized in the same manner as in Example 1 by using 224 g. (1 mole) of hexadecene-1 as a feed stock and 200 g. of each of the catalysts shown in Table 5. The yields of the amine were as indicated in Table 5.

TABLE 5

| Catalyst | Composition of catalyst percent | | | Yield of Imine (percent) |
|---|---|---|---|---|
| | Sulfuric acid | $BF_3$ | $H_2O$ | |
| 85% sulfuric acid, 100 g. plus (h), 100 g | 43 | 39 | 18 | 95 |
| 85% sulfuric acid, 170 g. plus (h), 30 g | 68 | 12 | 20 | 82 |
| 65% sulfuric acid, 150 g. plus (h), 50 g | 49 | 20 | 31 | 53 |
| 50% sulfuric acid, 100 g. plus (h), 100 g | 25 | 39 | 36 | 40 |

It was understood from the results shown in Tables 2 and 5 that higher yield can be obtained by use of the three-component catalyst in which the proportions of the components are in the range of 23–85% sulfuric acid, 5–30% water and 5–60% boron trifluoride.

EXAMPLE 5

(1) The catalysts supported on a solid carrier such as active carbon, active alumina, alumina silicate or the like was prepared as follows:

(a) 100 g. of aluminum hydrosilicate was impregnated with 10 g. of sulfuric acid and thereafter saturated with 70 g. of boron trifluoride. The resulting catalyst had a 30% aluminum silicate solid content, the remaining components being 53% sulfuric acid, 37% $BF_3$ and 10% water.

(b) 100 g. of aluminum hydrosilicate containing 18.9% moisture was saturated with 70 g. of boron trifluoride by blowing to prepare a catalyst. The resulting catalyst, represented by the formula $H(BF_3OH)$, had a 53% solid content, 37% $BF_3$ and 10% water. (This catalyst is used in combination with sulfuric acid.)

(2) Each of the catalysts prepared as above was used for the amine synthesis.

(a) 300 g. of the catalyst prepared in (1)(a) above was charged into a reactor, and the reaction was carried out in the same manner as in Example 1. 170 g. of dodecene-1 was then added dropwise to the reaction mixture, and the mixture was maintained at 50° C. for an hour to complete the reaction. After cooling, 40 g. of water and, subsequently, 400 ml. of a solvent mixture of equal volumes of n-hexane and ethanol were added to the reaction mixture, and the mixture was stirred and filtered to recover the catalyst. 300 ml. of 40% sulfuric acid was added to the filtrate, which was then heated to remove the solvent and hydrolyzed. The hydrolyzate was worked up in the usual manner to obtain an N-secondary-dodecyl primary amine (yield, 88%).

The above reaction was repeated once by using the recovered catalyst and the catalyst was found to be active (yield, 86%).

(b) 90 g. of the catalyst prepared in (1)(b) above was charged into a reactor and 196 g. (1 mole) of tetradecene-1 was added to the reactor at room temperature. 40 g. (1.5 mole) of liquid hydrocyanic acid was then added thereto while stirring, and thereafter 200 g. of 98% sulfuric acid (2 mole) was added dropwise over about 30 minutes while maintaining the temperature at 20 to 30° C. The reaction mixture was maintained at 40–60° C. for an hour to complete the reaction, followed by the addition of 40 g. of water. After allowing the mixture to stand for 30 minutes, 400 ml. of a solvent mixture of equal volumes of n-hexane and ethanol added to the mixture, followed by the filtration to recover the catalyst. 300 ml. of 40% sulfuric acid was then added to the filtrate, and, after the solvent being removed while heating, the mixture was hydrolyzed at 100° C. to 120° C. The resulting hydrolyzate was worked up in a usual manner to obtain an N-secondary-tetradecyl primary amine (yield, 92%).

The recovered catalyst was repeatedly used in the synthesis of amines in combination with sulfuric acid and was found to retain its activity. (Yield, 91%).

The above results indicate that the catalysts in solid form are equally effective to those in liquid form and are industrially advantageous in that they can be recovered more easily than those in liquid form. The physical and chemical properties of the N-secondary-alkyl primary amine compounds obtained by the process of this invention are shown in Tables 6 and 7 below.

TABLE 6

[Solubility (weight ratio of solvent to amine, 1/1; at 25° C.)]

| Solvent | N-sec-dodecyl primary amine | N-sec-octadecyl primary amine | N.branched chain dodecyl primary amine |
|---|---|---|---|
| Acetone | 100 | 100 | 100 |
| Isopropyl alcohol | 100 | 100 | 100 |
| Ethylene glycol | 100 | >50 | 100 |
| Olive oil | 100 | 100 | 100 |
| Mineral oil | 100 | 100 | 100 |
| Water | Insoluble | Insoluble | Insoluble |

TABLE 7.—PHYSICAL PROPERTIES

| Physical properties | N-sec-dodecyl primary amine | N-sec-octadecyl primary amine | N-branched chain dodecyl primary amine |
|---|---|---|---|
| Melting point (° C.) | −37 | 18 | >−60 |
| Boiling points (° C., at 10 mm.Hg) | 110 | 200 | 80 |
| Specific gravity (at 25° C.) | 0.79 | 0.81 | 0.81 |
| Viscosity (c.p., at 25° C.) | 4 | 12 | 2 |

The N-secondary-alkyl primary amines obtained by the process of this invention show an extremely low melting point as compared with the corresponding long-chain α-amines and, therefore, the amines of this invention and cationic surface active agents derived therefrom are particularly useful because of their superior characteristics which have hitherto been not observed.

The amines of this invention and their water-soluble salts are particularly useful as the raw material of cationic surface active agents.

What is claimed is:

1. A process for preparing an aliphatic amine which comprises reacting an olefine having at least 4 carbon atoms with hydrocyanic acid in the presence of an acid catalyst consisting of sulfuric acid, water and boron trifluoride and thereafter hydrolyzing the resulting reaction product with an acid or alkali, wherein said catalyst is a three-component system consisting of 23–85% sulfuric acid, 5–30% water and 5–60% boron trifluoride, there being between 1.1 and 1.5 moles of HCN for each mole of olefine in said reacting mixture.

2. A process according to claim 1, wherein said olefine is octene-1.

3. A process according to claim 1, wherein said olefine is dodecen-1.

4. A process according to claim 1, wherein said olefine is tetradecene-1.

5. A process according to claim 1, wherein said olefine is hexadecene-1.

6. A process according to claim 1, wherein said olefine is octadecene-1.

7. A process according to claim 1, wherein said olefine is propylene polymer.

8. A process according to claim 1, wherein said olefine is butylene polymer.

9. A process according to Claim 1, wherein said olefine is isobutylene.

10. A process according to claim 1, wherein said catalyst is a three-component system consisting of an aqueous sulfuric acid saturated with gaseous boron trifluoride.

11. A process according to claim 1, wherein said catalyst is in solid form prepared by impregnating aluminum hydrosilicate with sulfuric acid.

12. A process according to claim 1, wherein said catalyst is a three-component system prepared by mixing sulfuric acid with the water saturated with gaseous boron trifluoride.

13. A process according to claim 1, wherein said catalyst is in solid form prepared by saturating aluminum hydrosulfate with boron trifluoride.

References Cited

UNITED STATES PATENTS 2,632,022  3/1953  Bortnik _____ 260—563
3,347,918  10/1967  Schuster et al. _____ 260—563

CHARLES B. PARKER, Primary Examiner

D. R. PHILLIPS, Assistant Examiner

U.C. Cl. X.R.

252—33; 260—501.11, 557, 561, 563